Jan. 15, 1963   S. A. SWALLERT   3,073,272
INDICATING ASSEMBLY FOR CONTAINER
Filed March 30, 1962

United States Patent Office 3,073,272
Patented Jan. 15, 1963

3,073,272
INDICATING ASSEMBLY FOR CONTAINER
Sven Arild Swallert, 8b Ave. de Miremont,
Geneva, Switzerland
Filed Mar. 30, 1962, Ser. No. 183,843
Claims priority, application Switzerland Dec. 11, 1957
3 Claims. (Cl. 114—.5)

The invention refers to a fluid container with elastic walls adapted for immersion in a body of water, and is more particularly concerned with an assembly in association with the container for the purpose of indicating the contents of the container after immersion in a body of water and filling with a fluid having a specific weight which is less than that of water.

Various types of collapsible containers have been proposed for the storage of light fluids, e.g. gasoline, under water. Containers of this nature are disclosed in my co-pending application Serial No. 778,758, filed December 8, 1958, now abandoned.

In the case of such containers, it is very desirable to be able to have an indication of the quantity of fluid in the container at any given time.

It is, accordingly, an object of this invention to provide an indicating assembly adapted to be used with containers of the character mentioned to provide a visual indication of the quantity of fluid in the containers.

It is a further object of the invention to provide a collapsible container provided with an associated contents-indicating assembly.

In accordance with the invention, there is provided an indicating assembly for a collapsible container which comprises the combination of a piston having a rod which projects from one end of the cylinder and is adapted to be connected with the lower end of the collapsible container, the other end of the cylinder being adapted to be connected with the ballast normally used to cause the container to sink or vice versa, and a manometer connected with the space in the cylinder above the piston, i.e. the space through which the piston rod extends.

The manometer is preferably supported at the upper end of the hose used for filling and emptying the container and the space in the cylinder above the piston through which the piston rod extends, as well as the flexible conduit, e.g. tube, connecting this space with the manometer, are preferably filled with a pressure fluid, e.g. water.

Figure 1:
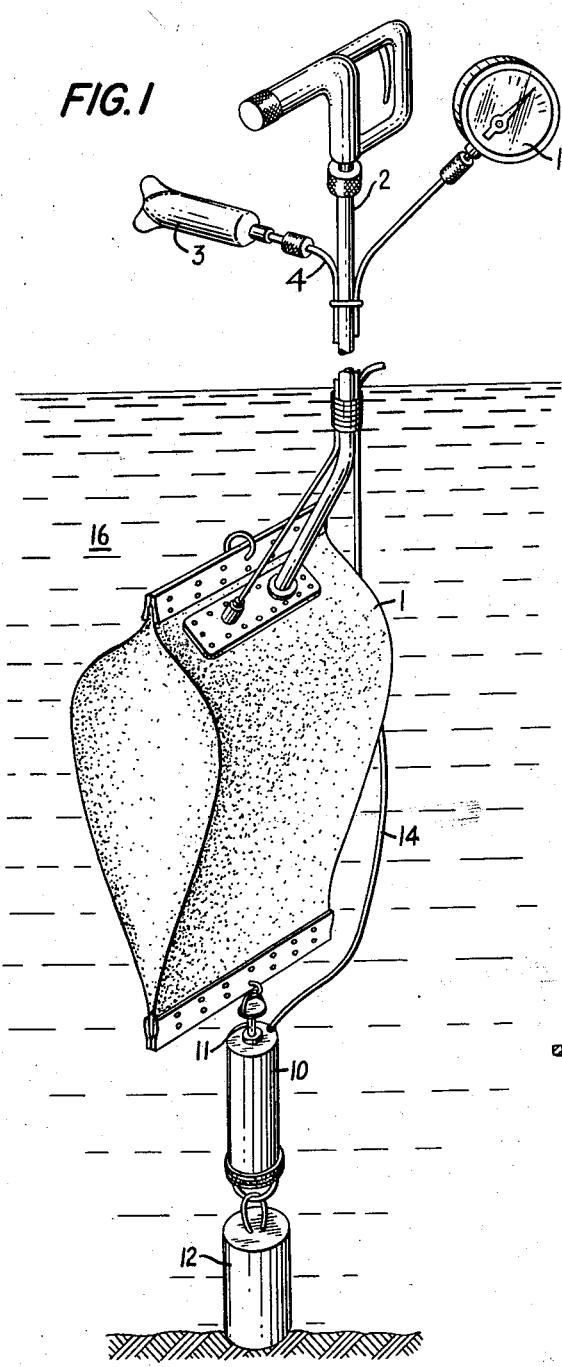
Figure 2:
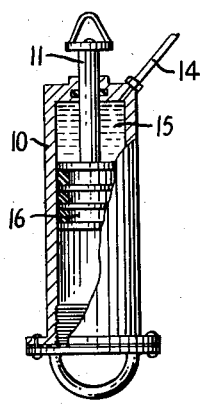
Figure 3:
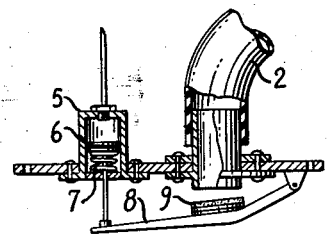

The invention will now be further described with reference to a specific embodiment thereof, taken in connection with the accompanying drawing wherein, FIG. 1 is a perspective view of a flexible fluid container provided with an indicating assembly embodying features of the present invention;

FIG. 2 is an elevational view on a larger scale and partly in cross-section of the cylinder and piston unit shown in FIG. 1; and FIG. 3 is an elevational view on a larger scale and partly in cross-section of a detail of the container illustrated in FIG. 1.

The flexible fluid container shown in FIG. 1 is suitably made of a flexible wall comprising a rubber foil 1 vulcanized on linen and provided with a filling and emptying hose 2 the opening of which is activated by air pressure. For this purpose a compressed air cartridge 3 is suitably connected by a conduit 4 to a cylinder 5, shown in detail in FIG. 3, containing a piston 6 which is pushed down by the compressed air against the action of a spring 7 and activates a lever 8 provided with a closure cap 9 which controls the closing and opening of the inlet to the hose 2 interiorly of the flexible container. The lower part of the flexible container is connected with a piston rod 11 projecting from a cylinder 10 with the opposite end of the cylinder 10 being connected with the ballast 12 which causes the sinking of the container, as seen in FIG. 2. A manometer 13 is connected by means of tubing 14 to the space above the piston 16 in the cylinder 10 through which the piston rod 11 extends, this space, as well as the tubing 14, being filled by a pressure liquid 15.

When the container normally holds a liquid having a specific weight which is less than that of water, and the container is immersed in a body of water, the pressure exerted via the piston 16 on the pressure liquid 15 is related to the quantity of the fluid, e.g. gasoline, contained in the container and this pressure can be read off immediately on the manometer 13 which is provided with a suitably-calibrated scale to indicate volume units corresponding to the pressure units transmitted to it.

The container described in my co-pending application Serial No. 778,758, with which the indicating assembly of the present invention is also advantageously used, is characterized by the fact that its total weight, including the ballast, is expressed by the following formula:

$$(V \times d_e - C \times d_p) < P < (V \times d_e - N \times C \times d_p)$$

in which:

P is the total weight of the container, including the ballast, in kilograms,
V is the total volume of the filled container, including the ballast, in liters,
$d_e$ is the specific gravity of the water, in which the container is immersed, in grams per cm.$^3$,
C is the total capacity of the container, in liters,
$d_p$ is the specific gravity of the liquid to be stored in the container, in grams per cm.$^3$,
N is a number smaller than 1.

In use, the empty container is delivered in the folded state and its hose is connected with a compressed air-cylinder or a compressor for inflating the container. The container is then connected with the ballast and the container is then dropped into the water, on the surface of which it floats in spite of the weight of the ballast. If the valve, e.g. the closure cap, is then opened, the container collapses progressively and sinks into the water until its ballast lies on the bottom of the body of water. It may then be filled, for example, with liquid fuel, which is pumped into it through the hose.

The cylinder unit of the indicating assembly will, of course, also function as ballast and, accordingly, in the following discussion the term "ballast" will be used to mean the sum of the ballast per se and the cylinder unit of the indicating assembly which is supported by the container.

In order to maintain the container, when filled with fuel having a specific gravity of 0.7, for example, below the surface of the water having a specific gravity of 1, the weight of the ballast will have to compensate for the difference in specific gravity. If the container has, for example, a capacity of 10,000 liters and a weight of 300 kg., the weight of the ballast should be at least 3,300 kg. When the volume of water displaced by the empty and not inflated container, its hose and the ballast is 600 liters, for example.

It is of advantage that this minimum weight of the ballast should not be exceeded very much if one wishes to be able to carry it from one place to another behind a boat after letting the container rise to the surface of the water, which may be easily achieved, if, for instance, one displaces 10% of the fuel it contains and substitutes a corresponding volume of air.

The total weight of the container, including the ballast, will be calculated in this case so as to be expressed by the following formula:

$$(V \times d_e - C \times d_p) < P < (V \times d_e - 0.9 \times C \times d_p)$$

in which:

P is the total weight of the container, including the ballast, in kilograms,

V is the total volume of the filled container, including the ballast, in liters, $d_e$ is the specific gravity of the water in which the container is immersed, in grams per cm.$^3$, C is the total capacity of the container, in liters, $d_p$ is the specific gravity of the liquid to be stored in the container, in grams per cm.$^3$, In the above-mentioned example, the total weight of the container, including the ballast will have to be comprised between 3,600 and 4,300 kg., the above formula then reading as follows:

$$(10,600 \times 1 - 10,000 \times 0.7) < P$$
$$< (10,600 \times 1 - 0.9 \times 10,000 \times 0.7)$$

In this case the value of N is 0.9, but it is clear that N may have any value smaller than 1. However, the smaller value of N, and therefore the greater the weight of the ballast 6, the higher will be the quantity of fuel which will have to be displaced and replaced by air to enable the container to rise to the surface of the water. If, for instance, the value of N is 0.5, the container has to be half emptied and 5,000 liters of air will have to be pumped therein to make it rise to the surface of the water.

It will be understood that the manometer 13 is suitably calibrated, as mentioned, in any convenient manner. Thus the manometer is suitably calibrated in 1000 U.S. gallons, with a possible reading of 500 U.S. gallons, for a total container capacity of 12,000 U.S. gallons. Three concentric scales can be provided respectively for liquids of densities of 0.70, 0.80 and 0.90 gr./cm.$^3$, for example, since obviously the pressure increase on the liquid 15 which is indicated on the manometer dial is different when identical amounts of liquids of different densities are delivered from the container.

It will also be understood that various changes and modifications may be made in the embodiments herein described without departing from the scope of the invention as defined in the appended claims. It is intended, therefore, that all matter container in the foregoing description and in the drawing shall be interpreted as illustrative only and not as limitative of the invention.

I claim:
1. A flexible fluid container adapted to be immersed in a body of water and to contain liquid having a specific weight less than that of water, said container including ballast means to insure immersion and an indicating assembly for said container, said assembly comprising, in combination, a unit defined by a cylinder and a piston slidable therein and having a piston rod extending from said cylinder, said unit being connected between the bottom of the container and the ballast means therefor, a manometer, and conduit means connecting said manometer with the space in said cylinder above said piston.

2. A flexible fluid container adapted to be immersed in a body of water and to contain liquid having a specific weight less than that of water, said container including ballast means to insure immersion and an indicating assembly for said container, said assembly comprising, in combination, a unit defined by a cylinder and a piston slidable therein and having a piston rod extending from said cylinder, said unit being connected between the bottom of the container and the ballast means therefor, a manometer, and conduit means connecting said manometer with the space in said cylinder above said piston, the interior of said conduit means and said space above said piston being adapted to be filled with a fluid for communicating the pressure exerted by said piston to said manometer.

3. A flexible fluid container adapted to be immersed in a body of water and to contain liquid having a specific weight less than that of water, said container including ballast means to insure immersion and an indicating assembly for said container, said assembly comprising, in combination, a unit defined by a cylinder and a piston slidable therein and having a piston rod extending from said cylinder, said unit being connected between the bottom of the container and the ballast means therefor, a manometer, and conduit means connecting said manometer with the space in said cylinder above said piston, said container further comprising a filling and emptying conduit having a free upper end and said manometer being disposed adjacent said upper end.

References Cited in the file of this patent

UNITED STATES PATENTS

| | | |
|---|---|---|
| 1,080,937 | Stephens | Dec. 9, 1913 |
| 2,383,840 | Benckert | Aug. 28, 1945 |
| 2,939,291 | Schurman | June 7, 1960 |